(No Model.)
J. BRANDON.
METALLIC PACKING FOR PISTONS.
No. 283,068. Patented Aug. 14, 1883.
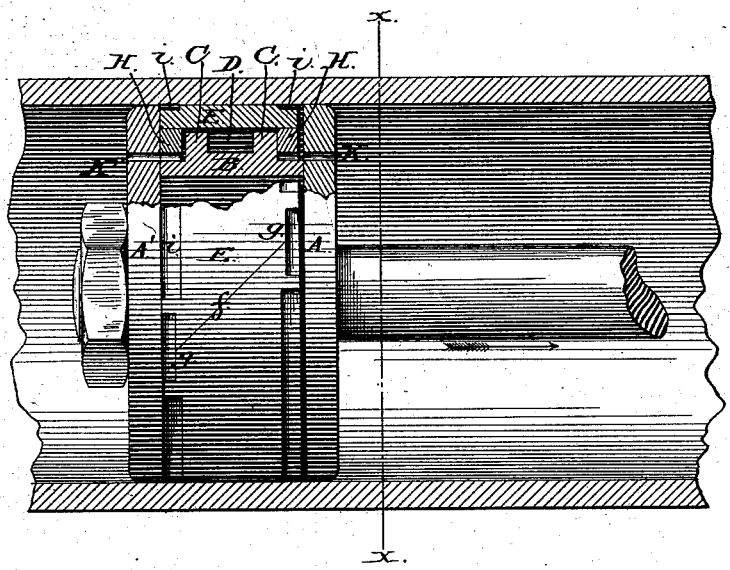
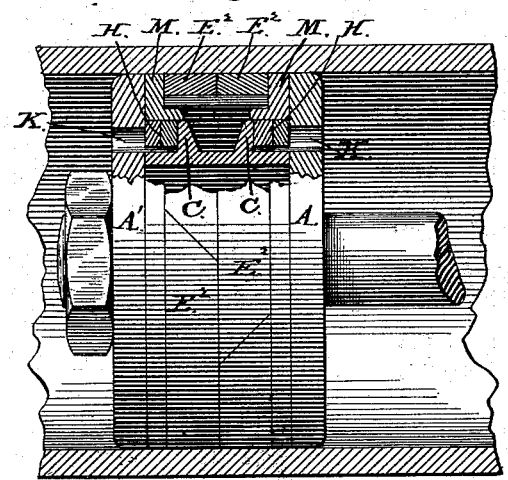
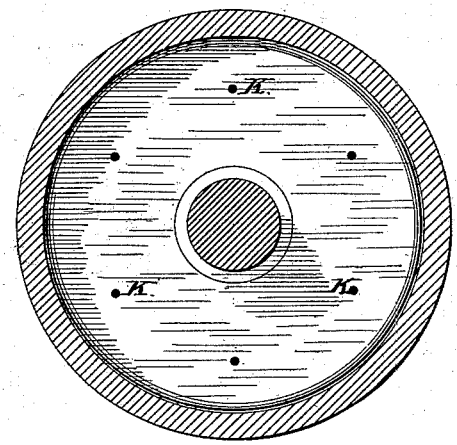

UNITED STATES PATENT OFFICE.

JAMES BRANDON, OF NEW YORK, N. Y.

METALLIC PACKING FOR PISTONS.

SPECIFICATION forming part of Letters Patent No. 283,068, dated August 14, 1883.

Application filed December 20, 1882. (No model.)

*To all whom it may concern:*

Be it known that I, JAMES BRANDON, of the city, county, and State of New York, have invented a new and useful Improvement in Metallic Packing for Pistons; and I do hereby declare that the following is a full and exact description thereof, reference being had to the accompanying drawings, and to the letters of reference marked thereon, making a part of this specification.

My invention relates to the packing of pistons in pumping-engines, and has for its object the relief of the piston from the friction due to an expansion of the packing-rings under the influence of the pressure of the column moved by the piston.

In the pistons for pumping-engines as now very generally in use the packing consists of two exterior rings superimposed upon an inner ring encircling the piston, all three of the rings being made elastic, and split to permit of their radial expansion, so that when inserted in the cylinder they shall bear outwardly against its inner periphery to make a tight joint therewith. These rings are inserted between the radial flanges produced by the radial projection of the front and rear plates or heads of the piston, and they are forced laterally against the one flange or the other, to make a tight joint therewith, by the pressure of the water or other fluid against which the piston is driven. This pressure not only forces the packing-rings against the rear flange, but, working in under the rings, operates with its full power to expand and force them against the cylinder. The result is that the friction of the piston in moving through the cylinder becomes very great and is increased in proportion to the resistance which the piston is called upon to overcome.

My invention is designed to obviate this unnecessary friction and to admit of an adjustment of the packing against the cylinder, which shall remain at all times constant and uniform, regardless of the pressure against the face of the piston.

It consists in forming annular flanges or offsets upon the periphery of the central body of the piston, far enough from its outer heads to admit of the insertion of a narrow split ring between each flange and the adjacent head, and in fitting upon the two rings a third split packing-ring whose outer circumference, flush with the circumference of the two heads of the piston, is adapted to bear against the inner face of the cylinder and form a packing for the piston, and is recessed on its edges far enough to produce a counterbalance of the radial pressure exerted thereon by the inner split rings. Communication is established between the under side of the narrow rings and the outer face of the piston on each side thereof by suitable openings, so that the pressure against said face will operate to force the ring against the flange back of it and to expand it against the concentric packing-ring encircling it, and thus form a tight joint at that end of the piston, this expansive pressure being counterbalanced, as above set forth, while the second ring on the opposite end of the piston remains loose, or is forced outwardly, leaving a free outward vent, preventing the accumulation of an expansive pressure upon the packing-ring.

In a modification of the invention the expansion of the inner ring, instead of being counterbalanced, as above set forth, is confined by a solid ring encircling the inner split ring.

In the accompanying drawings, Figure 1 is a sectional view illustrating my improved anti-friction piston-packing; Fig. 2, a similar view illustrating a modification of my invention; and Fig 3, a transverse section in line *x x* of Fig. 1.

A A' in said drawings represent the head-plates or head and follower of a piston, and B the cylindrical body thereof, against which the head-plates are secured. The body B may be solid or annular, and its circumference is so much less than that of the heads A A' as to leave an outer annular recess between them. In the construction of my improved piston the body B is encircled by two flanges, C C, leaving a narrow annular recess next to each head and a wide central recess, D, between the flanges. An annular packing-ring, E, is fitted, in the usual manner, between the two heads A A', so as to encircle and rest upon the flanges C C. This ring projects to the circumference of the piston, and is cut, as shown at *f*, to allow of its expansion, the split joint being broken at its ends, in the customary manner, by lateral strips $g$ $g$. A narrow split ring, H, is fitted loosely in each of the annular recesses, between the flanges C C and the heads of the piston. Apertures K K are drilled through the face of each head to afford communication between the outside of the piston and the space under each ring H. A recess, $i$, corresponding in width to that of the ring H is cut in the rim of the packing-ring E, on each edge thereof, as a means of counterbalancing the outward pressure of the inner ring, H, thereon.

In the operation of my improved piston, thus constructed and fitted with packing-rings, the movement of the piston in either direction—as, for example, from left to right, as indicated by the arrow in Fig. 1—will cause the pressure of the fluid in front of the piston to be transmitted through the apertures K against and under the inner ring, H, at that end of the piston. This pressure, acting upon the ring, will force it inward against the flange C to form a tight joint therewith, and will also expand it to produce a tight joint between it and the outer packing-ring, E. The ring E will also be forced back against the opposite head, so as to allow a transmission of the pressure to the recess $i$, and thus counterbalance the outward pressure of the inner ring, H, upon said packing-ring. If, by reason of any looseness in the joints of the ring H with the flange C and packing-ring E, a leak shall occur therein of the fluid in front of the piston, any pressure which might consequently accumulate inside of the ring E, tending to expand it, will operate to force the second inner ring, H, against the outer head or follower, A', of the piston and thereby open a free vent from the inner side of the ring E outward through the apertures K. When this piston moves in the opposite direction the foregoing conditions are reversed. The packing-ring is thus effectually relieved of all extraneous pressure, and will bear at all times against the cylinder with merely the constant uniform pressure due to its own elasticity supplemented, whenever required, by auxiliary springs inserted under it in the customary manner.

In the modification of my invention as shown in Fig. 2 the number of expansion-rings is multiplied, and the inner expansion-rings, H H, at each end bear against an outer narrow encircling-ring, M, interposed between the central packing-rings, $E^2$ $E^2$, and each head of the piston. The frictional pressure against the inner circumference of the cylinder, due to the resistance of the column of fluid in front of the piston, is herein limited to the narrow ring M, or may be wholly neutralized by making the ring either solid, so as to resist the expansion of the inner rings, H, or with a circumference slightly less than that of the cylinder, so as to allow a counterbalancing pressure between the two. In either case the main packing-rings E E of the piston are entirely relieved of the friction due to a pressure of the fluid in front of it, and which, in the pistons fitted with packing-rings in the customary manner, causes both the rings and the inner surface of the cylinder to wear rapidly when working under a high pressure, and involves a large waste of power.

I claim as my invention—

1. The combination, with the packing ring or rings of the piston in a pumping-engine, of vent-passages established from the under side of said packing ring or rings to the outer face of the piston, between the rings and piston, to relieve the former from the pressure of the fluid in the cylinder, and consequent friction, substantially in the manner as herein set forth.

2. The combination, with the expansible piston packing-ring E, flanges C C, expanding rings H H, and connecting-ports K K, of recesses $i$ $i$, cut on the outer face of the outer edges of the packing-ring E, substantially in the manner and for the purpose herein set forth.

In testimony whereof I have signed my name to this specification in the presence of two subscribing witnesses.

JAMES BRANDON.

Witnesses:
RUFUS CHANDLER,
DAVID A. BURR.